Figure 4:
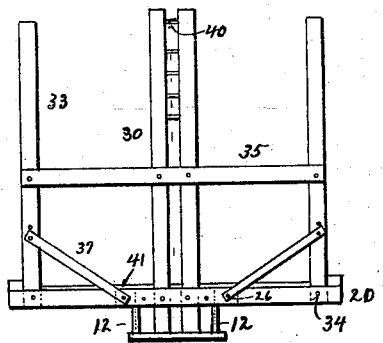

No. 858,798. PATENTED JULY 2, 1907.
J. N. EDGAR.
HAY RACK.
APPLICATION FILED JAN. 28, 1907.
2 SHEETS—SHEET 1.
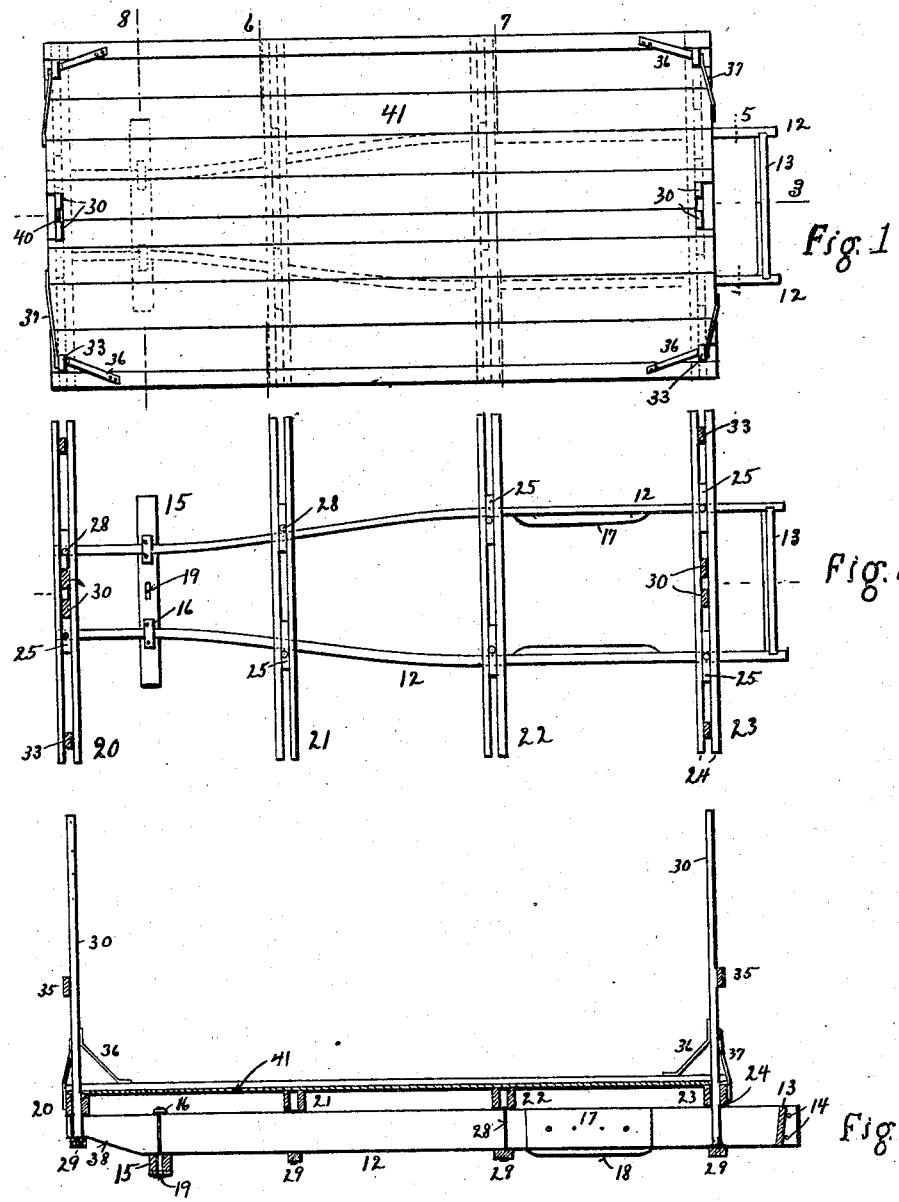

No. 858,798. PATENTED JULY 2, 1907.
J. N. EDGAR.
HAY RACK.
APPLICATION FILED JAN. 28, 1907.

2 SHEETS—SHEET 2.

Witnesses
J. T. Fisher
A. J. Rosen

Inventor
John W. Edgar
By J. A. Rosen atty

THE NORRIS PETERS CO., WASHINGTON, D. C.

UNITED STATES PATENT OFFICE.

JOHN N. EDGAR, OF SHAWNEE COUNTY, KANSAS.

HAY-RACK.

No. 858,798.   Specification of Letters Patent.   Patented July 2, 1907.

Application filed January 28, 1907. Serial No. 354,430.

*To all whom it may concern:*

Be it known that I, JOHN N. EDGAR, a citizen of the United States, residing in Shawnee county, in the State of Kansas, have invented a new and useful Improvement in Hay-Racks, of which the following is a specification.

The invention relates to hay-racks adapted for use on ordinary farm wagons, not only for carrying loose hay but also baled hay and all other like products, and as well it is adapted for carrying any other things, especially where a strong, broad, flat platform is desired.

Objects are: to improve generally upon hay-racks; to improve particularly in points of strength, simplicity, and durability; to provide a rack which can be made of lumber of the sizes always found in the market; to provide a rack which can be manufactured so as to be shipped "knocked down", and readily set up by the user; and to provide a rack which is at once easily made from ordinary materials of common dimensions, and yet which will not topple over and which will withstand the rough wear and tear which such things constantly receive.

The invention consists of the parts, improvements, and combinations hereinafter set forth and claimed.

In the drawings accompanying and forming part of this specification, and in the description thereof, I have shown my invention in its preferred form, and have shown what I deem to be the best mode of applying the principles thereof; but it is to be understood that, within the scope of the appended claims, I contemplate changes in form, proportions, and materials, the transposition of parts, and the substitution of equivalent members, without departing from the spirit of the invention.

Figure 5:
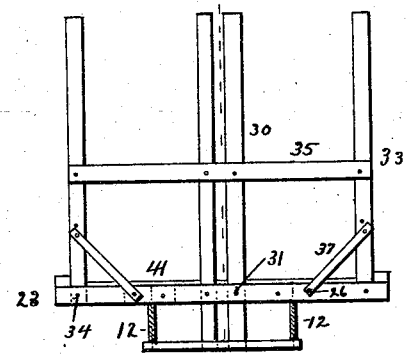
Figure 6:
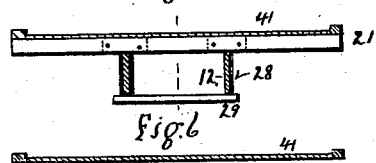
Figure 7:
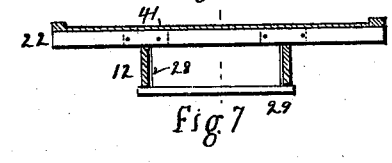
Figure 8:
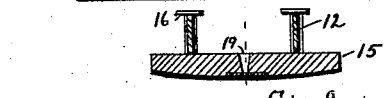
Figure 9:
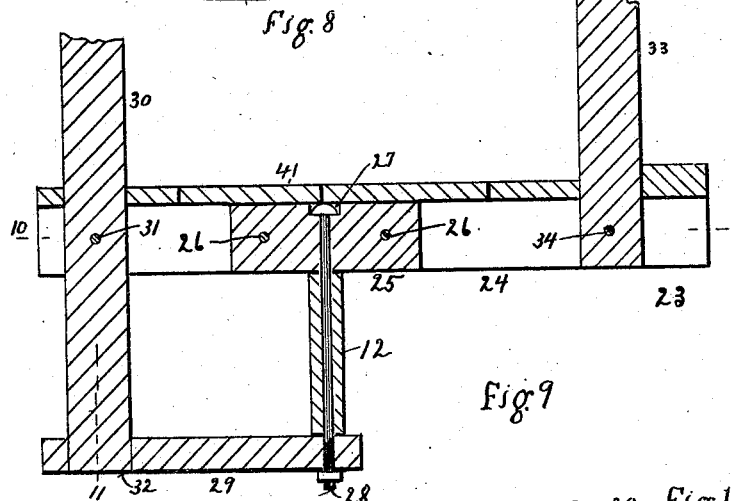
Figure 11:
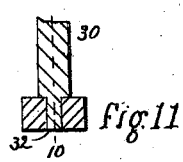
Figure 10:
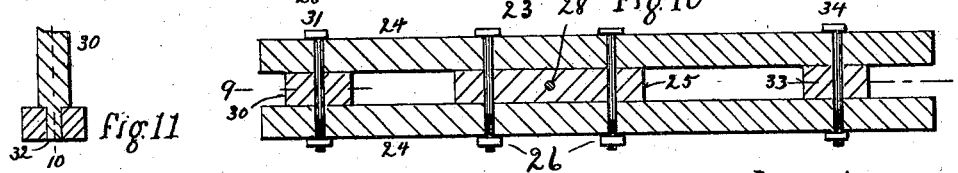

Figure 1 is a top view of a rack made in accordance with the principles of my invention. Fig. 2 is a plan view with the floor boards removed and the uprights or studs shown in section. Fig. 3 is a vertical central sectional view, through the line 3 of Fig. 1. Fig. 4 is a view of the front end. Fig. 5 is a view of the rear end. Fig. 6 is a sectional view of one of the intermediate cross-pieces, through the line 6 of Fig. 1. Fig. 7 is a view of the other intermediate cross-piece, through the line 7 of Fig. 1. Fig. 8 is a view taken through the forward bolster, line 8 of Fig. 1. Fig. 9 is an enlarged detail view in section (through line 9 of Fig. 10) of one-half of the rear cross-piece and adjoining parts, showing especially the simple and efficient manner of securing these parts together. Fig. 10 is a sectional view through the line 10 of Fig. 9. And Fig. 11 is a sectional view through the line 11 of Fig. 9 showing the manner of mortising the lower end of the upright.

Similar reference numerals indicate like or corresponding parts throughout the several views.

I provide the two main stringers 12, 12, which run from front to rear, and on which the rack is supported; they are preferably rigidly secured together at the rear by a cross-piece 13 and the long bolts 14 which extend from stringer to stringer, the ends of the cross-piece being slightly let into the stringers, whereby the ends are held firmly together. Toward the front end a bolster 15 is secured under the stringers by means of the plates and bolts 16. I prefer to have a bolster made especially for my improved rack of about the kind shown, and provided with a hole 19 for the king-bolt, having the usual plate at the bottom, but having its upper part widened lengthwise of the bolster so as to allow play for the king-bolt as the rack rocks, to prevent breaking the king-bolt. Where the rack rests on the rear bolster of the running gear, it should be reinforced by pieces 17, 17 bolted and nailed to the insides of the stringers, while the pieces 18 may be placed underneath to save wear on the stringers and also to lift it up or lower it as may be desired for any particular wagon, it being understood that this piece 18 may be applied either in manufacture, or by the user, or may be easily changed. On these stringers rest a number of cross-pieces 20, 21, 22, and 23, for the details of which I refer especially to Figs. 9 and 10 in connection with the other views, as the details shown in Figs. 9 and 10 are substantially the same in all four of the cross-pieces so far as the special features described in this paragraph are concerned. I take two pieces, as two-by-fours, of a length equal to the width of the rack, 24, 24, and at proper intervals I place between them the blocks 25, 25 which are bolted by bolts 26, 26 on each side of the countersunk hole 27, and through this hole is placed a bolt 28, which extends either through or by the side of the stringer 12, and under the stringer is placed another two-by-four 29 through which the bolt 28 is also passed. The bolts 28 for the front and rear cross-pieces 20 and 23 pass through the stringers; those for the cross-piece 21 pass on the outside, and those for the cross-piece 22 pass on the inside of the stringers. At the rear the stringers are of a width corresponding to the ordinary width between the wagon standards, say about thirty-eight inches; while at the front they are considerably closer together, say about twenty-two inches outside measurement. By properly placing the bolts 28 for the two intermediate cross-pieces, it will be noted that the stringers are bent into a compound, double, or reverse curve; the purpose being to so narrow the rack support that the front wheels can be turned under as far as possible, and in making the peculiar reverse curve, I not only accomplish this, but also secure a support for the rack which cannot be easily strained or twisted out of shape as where the stringers are straight. In this manner I can make the rack support narrow enough to turn the wheels into the coupling rod and at the same time oppositely from weakening the construction, I strengthen it.

Extending upwardly between the two members 24, 24 of the front and rear cross-pieces, are the middle studs 30, 30, placed quite close together, say about three inches, and bolted 31 to said members, and extending also downwardly and mortised 32 into the piece 29, the slot and tenon being cut preferably lengthwise of the piece 29. At each end of the front and rear cross-pieces are the studs 33, 33 bolted, 34, therebetween. These four studs at each end are connected by a piece 35 preferably about two feet from the platform, and are further secured by braces 36 and 37. These studs and pieces 35 make up the front and rear "ladders" of the rack, for which I claim superior strength, simplicity, rigidity, and durability.

The forward end of the stringers should be slightly cut away, 38, to afford ample clearance for the draft rigging. The flooring 41 is laid on the cross-pieces, the outside pieces being somewhat thicker than the others to better withstand the wear to which the edges of the platform are subjected. I provide a number of rods 40, 40 between the two middle studs of the forward ladder, by means of which the front end of the binding pole may be adjustably and simply fastened, its rear end being drawn down between the two middle studs of the rear ladder; and this prevents the pole from shifting sidewise. By using the bolt-blocks 25, I avoid passing the bolts 28 through the members 24, 24 and thus weakening them at their points of support.

What I claim is:

1. In a hay-rack, the combination of stringers extending from front to rear and forming the main support for the rack, each having a reverse-curve, and being closer together at the front than at the rear; cross-pieces each consisting of two members with a bolt-block therebetween over each stringer and bolts extending through said two members and said bolt block on each side of the bolt-hole, a piece 29 under the stringers for each cross-piece, and a bolt extending from each bolt-block to said piece 29 through or alongside of the stringer; a platform laid on said cross-pieces; and ladders at the front and rear.

2. In a hay-rack, the combination of the main supporting stringers; cross-pieces each consisting of two members set on edge, a bolt-block therebetween over each stringer, a piece 29 under each cross-piece, a bolt 28 extending down through each bolt-block through or alongside of the stringer and through the piece 29, and bolts 26, 26 extending through said bolt-block and said members, one on each side of said bolt 28; a platform laid on said cross-pieces; and ladders at the front and rear.

3. In a hay-rack, the combination with the stringers set on edge and extending lengthwise of the rack and forming the main support therefor, of the end and intermediate cross-pieces supported thereon, each consisting of a pair of members 24, 24 with bolt-blocks 25 therebetween, for securing same to the stringers without cutting said members 24, 24; front and rear ladders erected thereon, each comprising the middle studs 30, 30 extending between and secured to the two members 24, 24 of the end cross-piece, and also extending down and being secured to said piece 29, studs 33, 33 also secured between said members 24, 24, and a connecting bar 35.

4. In a hay-rack, the combination of the main supporting stringers, cross-pieces each consisting of two members set on edge, a bolt-block therebetween over each stringer, a piece 29 under each cross-piece, a bolt 28 extending down through each bolt-block through or alongside of the stringer and through the piece 29, and bolts 26, 26 extending through said bolt-block and said members, one on each side of said bolt 28; and a platform laid on said cross-pieces.

In testimony whereof I have hereunto signed my name in the presence of witnesses.

JOHN N. EDGAR.

Witnesses:
Z. T. FISHER,
C. J. ROSEN.